Patented Feb. 27, 1945

2,370,513

UNITED STATES PATENT OFFICE 2,370,513

PRODUCTION OF CONJUGATED DIOLEFINS

James L. Amos, Midland, and Frederick J. Soderquist, Bay City, Mich., assignors to The Dow Chemical Company, Midland, Mich., a corporation of Michigan No Drawing. Application February 28, 1942, Serial No. 432,825

11 Claims. (Cl. 260—680)

This invention relates to the production of conjugated diolefins and more particularly to the formation of the same by the dehydrogenation of olefins containing four to five carbon atoms in the molecule.

It is known that certain olefins may be dehydrogenated in gaseous phase under the influence of heat and solid catalytic bodies, such as metal compounds, porous substances, etc., to form conjugated diolefins. However, in previously known processes for carrying out such dehydrogenation difficulty has been experienced due to low conversion of the olefin to diolefin with consequent low percentages of diolefins in the effluent gas mixture, to the cracking of the olefin to form relatively large amounts of compounds containing a smaller number of carbon atoms in the molecule and to the rapid deposition of carbon on the catalyst body employed, thus rendering the latter ineffective after a short period of time.

We have found that alkenes having four to five carbon atoms in the molecule and having an unsaturated straight chain of at least four carbon atoms may be dehydrogenated readily, and with a high conversion during a single pass through the reaction zone, to form conjugated diolefins by pyrolyzing in the presence of water vapor and a hydrogen halide catalyst. We have further found that when the dehydrogenation is carried out in this manner, the use of the usual solid catalytic bodies, such as metal compounds, porous substances, etc., is unnecessary and, consequently, the necessity of frequently stopping the operation to clean or regenerate such solid catalyst is avoided. By using a hydrogen halide catalyst to promote the reaction, carbonization may be greatly reduced and the amount of cracking to form by-products having fewer carbon atoms in the molecule than the alkene reactant may be reduced below that usual when employing only solid catalysts in the reaction. An additional advantage resulting from the use of a hydrogen halide catalyst is that a crude diolefin fraction containing an exceptionally high proportion of diolefin may be recovered from the reacted mixture, thus greatly facilitating isolation of purified diolefin from the fraction.

The dehydrogenation is carried out in any suitable manner, e. g., by passing the alkene, water, and hydrogen halide catalyst in vapor phase through heated tubes. Although the process is preferably carried out in the absence of the usual solid catalytic bodies, it should be mentioned that such bodies may also be employed if desired. In some instances the use of such catalytic bodies will even lead to appreciably better yields of diolefin than when the solid catalytic body is omitted. Furthermore, the use of water vapor and hydrogen halide in the reaction mixture decreases the deposition of free carbon on the catalytic body and increases the length of time over which the latter may be used without regeneration. However, the advantages gained by the use of such solid catalytic bodies do not usually justify the added expense and inconvenience involved.

The alkene, which may comprise 1-butene, 2-butene, 2-methyl-1-butene, 2-methyl-2-butene, 2-methyl-3-butene, 1-pentene, or 2-pentene may arise in any of a number of ways, such as by a cracking operation, by dehydrogenation of a paraffin hydrocarbon, or by the elimination of a hydrogen halide from a haloparaffin. Although the purity of the reaction product depends somewhat on the purity of the alkene used, the invention contemplates the use of the alkenes, or mixtures thereof, with at least minor proportions of other hydrocarbons, such as propane, butane, pentane, propene, isobutene, etc.

The hydrogen halide catalyst may be obtained from any convenient source, such as by the action of sulphuric acid on sodium chloride or as by-product hydrogen halide recovered from a halogenation reaction wherein a hydrogen halide is one of the products. Organic compounds such as mono- or polyhalohydrocarbons, halohydrins, halocarboxylic acids, halo esters, etc., which are capable of being decomposed during the pyrolysis to form a hydrogen halide may also be used as a means of introducing the hydrogen halide into the reaction mixture, and are herein included in the term "hydrogen halide catalyst." In similar manner the term "hydrogen bromide catalyst," as used herein, includes hydrogen bromide and compounds which decompose during the pyrolysis to form hydrogen bromide. Among the halogen compounds which may be incorporated in the reaction mixture and which decompose during the pyrolysis to furnish a hydrogen halide are ethylene chloride, ethyl bromide, propylene bromide, proply chloride, butyl bromide, butyl chloride, butyl iodide, butylene bromide, butylene chloride, amyl bromide, allyl bromide, ethylene bromohydrin, ethylene chlorohydrin, propylene chlorohydrin, chloroacetic acid, bromoacetic acid, ethyl chloroacetate, ethyl bromoacetate, chloroethyl acetate, etc. The use cf haloparaffins having the same number of carbon atoms in the molecule as the diolefin being produced is particularly advantageous, since during the decomposition of the haloparaffin to produce a hydrogen halide, the desired conjugated diolefin is usually also formed. Mixtures of hydrogen halide catalysts may be used, if desired. When hydrogen chloride is used, its constant boiling mixture with water may be employed advantageously, since the use of such mixture simplifies the introduction of the acid and water in constant proportion into the reaction mixture. Furthermore, the constant boiling mixture may be condensed readily from the reacted mixture, if desired, and be re-used in the process. Alternatively, the water may be introduced as steam into the reaction mixture.

The proportions of the reactants will, of course, vary somewhat with the particular alkene and hydrogen halide catalyst used and also with the reaction conditions which are employed. Thus, under otherwise comparable conditions, hydriodic acid is more effective than hydrobromic acid, which, in turn, is more effective than hydrochloric acid. Less than one chemical equivalent, usually from 0.01 to 0.8 chemical equivalent of hydrogen halide catalyst is used for each mol of alkene. It should be mentioned that a chemically equivalent proportion of hydrogen halide catalyst is considered herein as being equal to the molecular proportion of the same divided by the number of halogen atoms in the molecule. From 1 to 60 mols, preferably from 3 to 45 mols, of water is used for each mol of alkene, although larger proportions of water may be used, if desired. It is, of course, obvious that the use of excessive proportions of water may render the process less economical due to the larger amount of heat required to bring the mixture to the pyrolyzing temperature.

The reactants are usually preheated separately before being mixed together and subjected to the pyrolysis, although they may be heated after being mixed, if desired. The steam may be advantageously superheated and mixed with the other ingredients to supply the heat of pyrolysis to the mixture. It should be mentioned that corrosion of the equipment used for handling the reactants may be greatly reduced by introducing the hydrogen halide catalyst in the form of a compound which decomposes in the reaction zone to liberate a hydrogen halide or, in case a hydrogen halide is used, by admixing it, preferably without preheating, with the other ingredients just prior to the entrance of the reaction mixture into the reaction zone.

Although the reaction temperature depends somewhat upon the hydrogen halide catalyst used and the proportion thereof in the reaction mixture, the dehydrogenation is usually carried out at temperatures between 600° and 950° C., preferably between 650° and 900° C. The time of pyrolysis is usually measured by the space velocity of the alkene within the reaction zone. The space velocity of the alkene may be defined as the number of cubic feet of gaseous alkene, referred to standard conditions of 0° C., and 760 mm. of mercury pressure, passing through the reaction zone per hour per cubic foot of reaction zone. It should be noted that the space velocity as defined above refers to the alkene in the reaction mixture and not to the reaction mixture as a whole. Thus, the space velocity of the alkene may be spoken of independently of the composition of the reaction mixture. The space velocity of the alkene is usually maintained between 200 and 600, and preferably between 250 and 500. Higher or lower space velocities may, of course, be maintained if desired. The dehydrogenation is usually carried out at atmospheric pressure, but higher or lower pressures may be used.

The use of the dioxides of sulfur and selenium in the pyrolysis mixture as disclosed in our copending application Serial No. 432,824 increases the effectiveness of the hydrogen halide catalyst in promoting the formation of the diolefin. Such oxide is usually used in an amount corresponding to between 0.01 and 0.6 mol for each mol of alkene. The sulphur dioxide may be introduced in gaseous phase, and the selenium dioxide may conveniently be dissolved in the water and the solution then heated and vaporized or atomized into the reaction zone. The sulphur and selenium dioxides are largely converted during the pyrolysis into hydrogen sulphide and hydrogen selenide, respectively.

After the pyrolysis, the reacted mixture which comprises water vapor, a hydrogen halide, the conjugated diolefin, i. e., 1.3-butadiene or a methylbutadiene, and any unconverted alkene together, usually, with minor amounts of saturated and unsaturated hydrocarbons having a different number of carbon atoms in the molecule than the alkene used, may be treated in any of a number of ways to recover the conjugated diolefin formed during the pyrolysis. For example, the gaseous mixture may be cooled to condense out an aqueous solution of the hydrogen halide which may either be discarded or returned to the pyrolysis step. The uncondensed portion may be scrubbed with water to remove any remaining traces of hydrogen halide, and the washed gases then fractionally condensed to recover the unreacted alkene and the formed diolefin as a liquid fraction containing a high concentration of the latter. The mixture of alkene and diolefin may then be separated into its components in known manner, e. g., by extraction with a selective solvent for the diolefin or by reaction of the diolefin with a reagent such as cuprous chloride to form an insoluble complex salt, to recover substantially pure conjugated diolefin and an alkene fraction which may, if desired, be returned to the pyrolyzing step. In some instances the mixture of alkene and diolefin may be used directly as a source of diolefin, e. g., in the preparation of sulphones of diolefins by selective reaction of the diolefin in the hydrocarbon mixture with sulphur dioxide.

Hydrogen sulphide or hydrogen selenide, if present in the reacted mixture are partially removed during the scrubbing with water, but are contained principally in the vent gases after separation of the fraction containing the alkene and diolefin. The vent gases may be discarded or, in case they contain the relatively valuable selenium, they may, if desired, be burned to recover the latter as the dioxide which may be re-used in the pyrolysis step.

The accompanying table shows the results of a number of experiments carried out at atmospheric pressure in each of which one mol of the alkene listed was passed together with the noted amounts of steam and of the indicated hydrogen halide catalyst through a heated reaction chamber. The pyrolysis conditions, i. e., the space velocity of the alkene and the temperature, are noted for each experiment together with the mols of alkene recovered, the mols of conjugated diolefin formed, and the mols of diolefin formed per mol of alkene consumed. In the last column is listed the per cent diolefin in the recovered fraction containing the alkene and diolefin prior to separation into its components.

Table

| Exp. No. | Alkene | Mol alkene used | Hydrogen halide catalyst | Mols catalyst | Mols steam | Pyrolysis conditions | | Mol alkene recovered | Mol conjugated diolefin formed | Mol diolefin formed per mol alkene consumed | Per cent diolefin in alkene-diolefin fraction |
|---|---|---|---|---|---|---|---|---|---|---|---|
| | | | | | | Space velocity | Temp., °C. | | | | |
| 1 | 1-butene | 1 | None | | 15 | 386 | 775 | 0.718 | 0.087 | 0.131 | 7.1 |
| 2 | do | 1 | HCl | 0.1 | 10 | 374 | 775 | 0.572 | 0.106 | 0.248 | 16.8 |
| 3 | do | 1 | HBr | 1.0 | 10 | 370 | 775 | 0.642 | 0.147 | 0.411 | 20.9 |
| 4 | do | 1 | HBr | 0.1 | 10 | 372 | 775 | 0.389 | 0.228 | 0.373 | 33.2 |
| 5 | do | 1 | HBr | 0.1 | 10 | 375 | 825 | 0.153 | 0.33 | 0.39 | 61.0 |
| 6 | do | 1 | HBr | 0.01 | 10 | 369 | 775 | 0.497 | 0.145 | 0.288 | 21.0 |
| 7 | do | 1 | HI | 0.1 | 10 | 375 | 775 | 0.605 | 0.217 | 0.55 | 25.0 |
| 8 | do | 1 | HI | 0.01 | 10 | 372 | 775 | 0.598 | 0.160 | 0.398 | 21.2 |
| 9 | do | 1 | HBr [1] | 0.1 | 10 | 350 | 825 | 0.155 | 0.380 | 0.45 | 68.0 |
| 10 | do | 1 | HBr [1] | 0.1 | 10 | 350 | 800 | 0.25 | 0.360 | 0.54 | 48.0 |
| 11 | do | 1 | BrC$_2$H$_4$OH | 0.1 | 10 | 372 | 800 | 0.288 | 0.320 | 0.45 | 50.0 |
| 12 | do | 1 | C$_3$H$_5$Br | 0.01 | 10 | 374 | 800 | 0.12 | 0.23 | 0.28 | 53.0 |
| 13 | Mixture of 1-butene and 2-butene | 1 | HCl | 0.945 | 7.5 | [2] 550 | 775 | 0.405 | 0.244 | 0.411 | 34.9 |
| 14 | do | 1 | HCl | 0.92 | 7.5 | [2] 350 | 750 | 0.52 | 0.267 | 0.556 | 31.2 |
| 15 | Crude butene [5] | 1.0 | | | 5.9 | [2] 334 | 750 | 0.34 | 0.20 | 0.30 | 27.5 |
| 16 | do [1] | 1.0 | HBr | 0.17 | 6.7 | [3] 348 | 725 | 0.41 | 0.25 | 0.41 | 28.6 |
| 17 | do [1] | 1.0 | | | 7.0 | [4] 370 | 725 | 0.37 | 0.16 | 0.24 | 22.7 |
| 18 | do [1] | 1.0 | HBr | 0.20 | 8.1 | [4] 346 | 700 | 0.37 | 0.28 | 0.45 | 33.2 |
| 19 | Crude pentene [6] | 1.0 | HBr | 0.18 | 7.1 | [3] 305 | 725 | 0.123 | 0.37 | 0.41 | 65.3 |
| 20 | do [6] | 1.0 | | | 9.8 | [4] 293 | 725 | 0.54 | 0.17 | 0.36 | 20.4 |

[1] Reaction mixture also contained 0.05 mol sulphur dioxide.
[2] Reaction chamber packed with 4-10 mesh pumice.
[3] Reaction chamber packed with 4-8 mesh activated alumina.
[4] Reaction chamber packed with 4-8 mesh natural bauxite.
[5] Composition of crude butene: n-butene 81.8%, iso-butene 14.6%, butane 2.5%, combined high and low boiling fractions 1.1%.
[6] Composition of crude pentene: pentenes 95.9%, pentane 2.8%, high boiling fraction 1.3%.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. The method for preparing a conjugated diolefin which consists in passing a gaseous mixture comprising an alkene containing from four to five carbon atoms in the molecule and having an unsaturated straight chain of at least four carbon atoms, water vapor, an oxide selected from the class consisting of sulphur dioxide and selenium dioxide, and a hydrogen halide catalyst through a reaction zone maintained at a temperature in the range 600° to 950° C.

2. The method for preparing a conjugated diolefin which consists in passing a gaseous mixture comprising an alkene containing from four to five carbon atoms in the molecule and having an unsaturated straight chain of at least four carbon atoms, water vapor, an oxide selected from the class consisting of sulphur dioxide and selenim dioxide, and a hydrogen halide catalyst at a space velocity of from 200 to 600 through a reaction zone maintained at a temperature in the range 650° to 900° C. and recovering a conjugated diolefin from the reacted mixture.

3. The method for preparing a conjugated diolefin which consists in passing a gaseous mixture comprising one molecular proportion of an alkene containing from four to five carbon atoms in the molecule and having an unsaturated straight chain of at least four carbon atoms, from 3 to 45 molecular proportions of water vapor, from 0.01 to 0.6 molecular proportions of an oxide selected from the class consisting of sulphur dioxide and selenium dioxide, and from 0.01 to 0.8 chemically equivalent proportions of a hydrogen halide catalyst at a space velocity of from 200 to 600 through a reaction zone maintained at a temperature in the range 650° to 900° C. and recovering a conjugated diolefin from the reacted mixture.

4. The method for preparing 1.3-butadiene which consists in passing a gaseous mixture comprising a normal butene, water vapor, an oxide selected from the class consisting of sulphur dioxide and selenium dioxide, and a hydrogen halide catalyst through a reaction zone maintained at a temperature in the range 600° to 950° C.

5. The method for preparing 1.3-butadiene which consists in passing a gaseous mixture comprising a normal butene, water vapor, an oxide selected from the class consisting of sulphur dioxide and selenium dioxide, and a hydrogen halide catalyst at a space velocity of 200 to 600 through a reaction zone maintained at a temperature in the range 600° to 950° C.

6. The method for preparing 1.3-butadiene which consists in passing a gaseous mixture comprising one molecular proportion of a normal butene, from 1 to 60 molecular proportions of water vapor, from 0.01 to 0.6 molecular proportions of an oxide selected from the class consisting of sulphur dioxide and selenium dioxide and from 0.01 to 0.8 chemically equivalent proportions of a hydrogen halide catalyst at a space velocity of from 200 to 600 through a reaction zone maintained at a temperature in the range 600° to 950° C.

7. The method for preparing 1.3-butadiene which consists in passing a gaseous mixture comprising one molecular proportion of a normal butene, from 3 to 45 molecular proportions of water vapor, from 0.01 to 0.6 molecular proportions of an oxide selected from the class consisting of sulphur dioxide and selenium dioxide and from 0.01 to 0.8 chemically equivalent proportions of a hydrogen bromide catalyst at a space velocity of from 250 to 500 through a reaction zone maintained at a temperature in the range 650° to 900° C. and recovering 1.3-butadiene from the reacted mixture.

8. The method for preparing 1.3-butadiene which consists in passing a gaseous mixture comprising one molecular proportion of a normal butene, from 3 to 45 molecular proportions of water vapor, from 0.01 to 0.6 molecular proportions of sulphur dioxide and from 0.01 to 0.8 chemically equivalent proportions of a butylene bromide at a space velocity of from 200 to 600 through a reaction zone maintained at a temperature in the range 650° to 900° C.

9. The method for preparing 1.3-butadiene which consists in passing a gaseous mixture comprising one molecular proportion of a normal butene, from 3 to 45 molecular proportions of water vapor, sulphur dioxide and from 0.01 to 0.8 molecular proportions of hydrogen bromide at a space velocity of from 200 to 600 through a reaction zone maintained at a temperature in the range 650° to 900° C.

10. The method for preparing 1.3-butadiene which consists in passing a gaseous mixture comprising one molecular proportion of a normal butene, from 3 to 45 molecular proportions of water vapor, from 0.01 to 0.6 molecular proportions of sulphur dioxide and from 0.01 to 0.8 molecular proportions of hydrogen bromide at a space velocity of from 200 to 600 through a reaction zone maintained at a temperature in the range 650° to 900° C.

11. The method for preparing 1.3-butadiene which consists in passing a gaseous mixture comprising one molecular proportion of a normal butene, from 3 to 45 molecular proportions of water vapor, from 0.01 to 0.6 molecular proportions of sulphur dioxide and from 0.01 to 0.8 chemically equivalent proportions of a hydrogen chloride catalyst at a space velocity of from 200 to 600 through a reaction zone maintained at a temperature in the range 650° to 900° C. and recovering 1.3-butadiene from the reacted mixture.

JAMES L. AMOS.
FREDERICK J. SODERQUIST.